Feb. 23, 1926.  1,574,425
E. JORDAN
SEPARATION OF GASEOUS MIXTURES BY LIQUEFACTION AND RECTIFICATION
AND APPARATUS THEREFOR
Filed April 24, 1923   6 Sheets-Sheet 3

INVENTOR
Eugène Jordan
BY
Pennie Davis Marvin & Edmonds
ATTORNEY

Feb. 23, 1926. 1,574,425
E. JORDAN
SEPARATION OF GASEOUS MIXTURES BY LIQUEFACTION AND RECTIFICATION
AND APPARATUS THEREFOR
Filed April 24, 1923   6 Sheets-Sheet 4

INVENTOR
Eugene Jordan
BY
ATTORNEY

Patented Feb. 23, 1926.

1,574,425

UNITED STATES PATENT OFFICE.

EUGÈNE JORDAN, OF PARIS, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

SEPARATION OF GASEOUS MIXTURES BY LIQUEFACTION AND RECTIFICATION AND APPARATUS THEREFOR.

Application filed April 24, 1923. Serial No. 634,206.

*To all whom it may concern:*

Be it known that I, EUGÈNE JORDAN, a citizen of the Republic of France, residing at Paris, Republic of France, have invented certain new and useful Improvements in Separation of Gaseous Mixtures by Liquefaction and Rectification and Apparatus Therefor; and I do hereby declare the following to be a full, clear, and exact description of the invention, such as will enable others skilled in the art to which it appertains to make and use the same.

This invention relates to refrigeration as applied to the liquefaction of gaseous mixtures and the separation of the constituents of such mixtures.

In the use of refrigeration to separate a gaseous mixture into its elements by liquefaction and rectification where the cold is obtained by the expansion of a gas producing external work, it is the usual practice to use the gas, leaving the chamber in which it expands, as a carrier for the cold resulting from expansion and to avoid a loss across the wall of this chamber by insulating this wall externally. After its expansion the gas is delivered to the liquefaction and rectification apparatus, of which the heat insulation is independent of that of the expansion chamber which is separated from that apparatus.

With this procedure, we do not obtain the best yield of cold produced by the expansion by reason of the inevitable losses of cold during the transportation thereof from the expansion chamber where it is produced to the points in the apparatus where it is utilized. There are also some losses during the travel between the apparatus and the expansion chamber, by the gas which is caused to expand after a preliminary cooling by heat exchange.

The improvements which are the object of the present invention permit of increasing this yield for the separation of a gaseous mixture into its constituents by liquefaction and rectification, a great part of the cold produced by the expansion being no longer carried away by the gas leaving the expansion chamber, but utilized on the spot in the manner hereinafter described. The travel then of the expanded gas, as well as the travel of the already cold gas which is about to expand between the apparatus and the expansion chamber, is considerably reduced.

According to the method, the gaseous mixture, the constituents of which are to be separated, is partially liquefied by means of cold obtained by the expansion of a gas producing external work, the transmission of the necessary cold being effected directly across a conducting wall which is common to both the chamber wherein expansion takes place and the chamber in which the partial liquefaction occurs. In the latter chamber the liquid and gaseous parts are subjected to rectification. These chambers can, moreover, be juxtaposed to the remainder of the apparatus proper under the same insulation. Eventually, particularly for the separation of air into its constituent elements, the gas which expands could be the gaseous residue from the partial liquefaction obtained as described above.

For conducting the operation, suitable apparatus may be employed. For example, a vertical expansion cylinder may be jacketed to permit circulation of the gaseous mixture in an upward direction. Thus, partial liquefaction is effected by the cold transmitted across the wall of the expansion chamber while at the same time there is a rectification of the condensed liquid which, descending by gravity, circulates in a reverse direction to the direction of travel of the gaseous mixture.

In order to increase the useful effect of this rectification, the cylinder should be sufficiently long in proportion to its diameter, and it would be of advantage to increase the surfaces along which condensation takes place by disposing along the path of the gaseous mixture between the two walls (within the jacket), a plurality of fins made of a material having a high heat conductivity and attached to the wall of the expansion chamber with which the expanding gas is in contact. Moreover, any other rectification device could be employed, as for instance, superposed dephlegmator plates of the "bubbling" type, constituting thus a sort of annular distillation column in the center of which is the expansion chamber or cylinder in which the piston operates.

As indicated, it is desirable to locate the expansion cylinder as close as possible to the rest of the apparatus within a common insulating jacket. Heretofore the reciprocating expansion engines in which, for the purpose of refrigeration, a gas is expanded with external work, are, taken as a whole, similar to compressed air motors, i. e., a piston rod, through the intermediary of a connecting rod and a crank, actuates a shaft carrying a flywheel and a pulley, by means of which the power is transmitted to a machine for utilizing this power or acting merely as a brake for the motor by converting the power into heat which is dissipated into the surrounding atmosphere as in the case of a dynamometer. The delivery of the gas to be expanded into the cylinder is likewise effected by the customary mechanisms provided for this purpose in compressed-air motors, viz, by means of slide or poppet valves mechanically actuated by devices such as eccentrics, cams and rods, set in motion by the motor itself. There is thus between the piston and the distributing mechanism proper (slide or poppet valves), a mechanical connection accomplished by means of movable parts arranged externally to the cylinder and the valve-box.

The expansion cylinder may be placed under the same insulating jacket as the rest of the apparatus by giving to the piston rod a sufficient length to make its further end extend beyond the jacket whereby it is possible to place the mechanism to be actuated by this rod and the frame supporting this mechanism outside the insulating jacket. This arrangement has the advantage of avoiding direct contact between the very cold expansion cylinder and metallic masses of rather considerable size as compared with that of the cylinder, thus avoiding losses by conduction. However, it is necessary that the gas distributor delivering gas into the cylinder be placed very close to the latter, and, it follows that the control of this distributor by means of moving devices exterior to the cylinder and the valve chests and hence located within the insulating jacket itself, is not practical.

By means of a mechanism peculiar to the present invention these moving parts are avoided, the essential purpose of this mechanism consisting in effecting the displacement of the movable distributor by applying thereto, within the enclosing valve chest, an impulse applied at the appropriate instant, by one of the moving parts of the expander. The transmission of this impulse to the distributor may be either pneumatic, electric or magnetic, without any movable actuating mechanism. Moreover, these various modes of transmitting force could be combined together.

The annexed drawings represent diagrammatically various modes of practical embodiment of the apparatus described above. In the drawings.

Figures 1, 2, 3, 4, 5, 6:
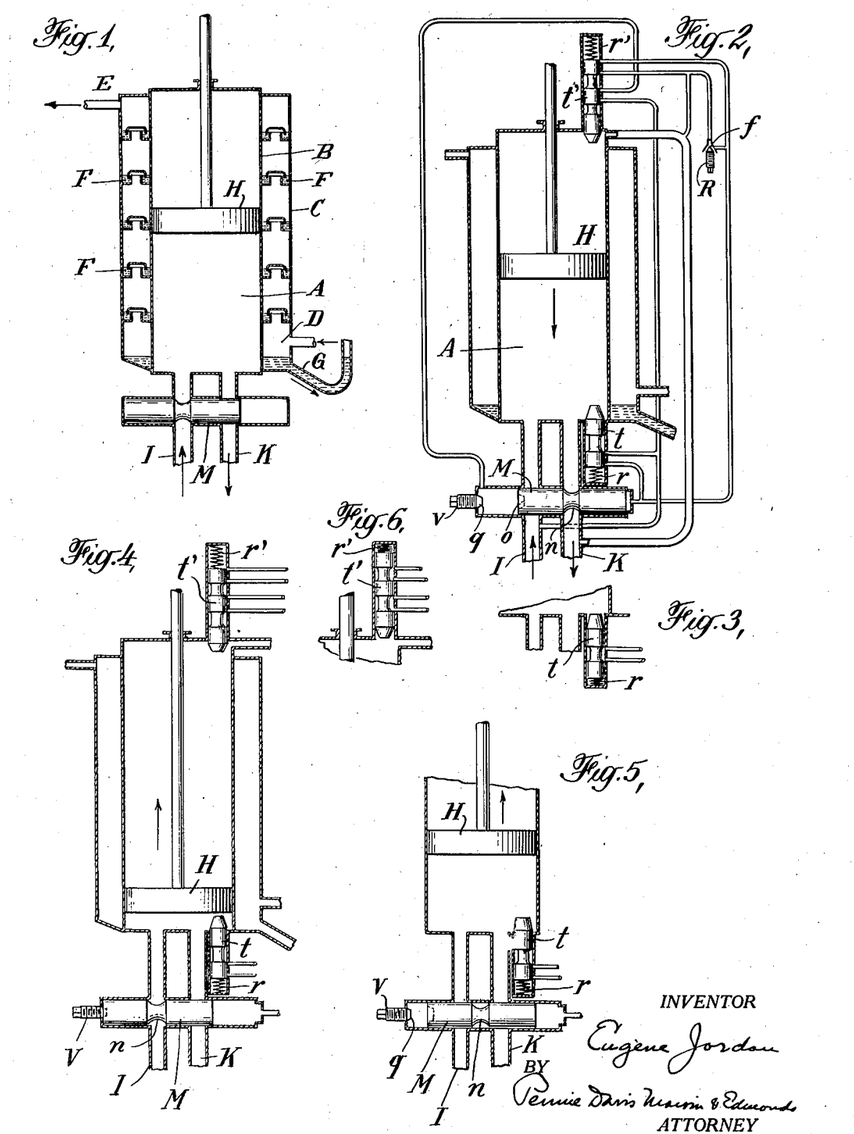
Fig. 1 is a diagram indicating a simple form of the invention.
Figs. 2 to 6 are similar views indicating the operation of the valve mechanism.

Fig. 1, which is a vertical section, shows a single-effect expansion cylinder A provided with two walls B and C between which the gaseous mixture circulates from below upward, while it is subjected to a process of partial liquefaction and simultaneous rectification. This mixture enters at D after having already been cooled by its passage through a heat exchanger and leaves at E. Rings F operate in the manner of rectifying plates on which the liquids formed by partial condensation of the gaseous mixture collect. These liquids, descending by gravity, are traversed by the ascending gaseous mixture so that, in proportion to their rate of reflux, they become enriched in the most readily condensable constituent and drain back to the bottom in the form of a liquid enriched in that constituent which leaves the apparatus at G.

The gas, which is expanded in the cylinder and which acts by its pressure on the piston H during the upward stroke of the latter, enters under pressure through the inlet port I, after the preliminary cooling thereof by heat exchange, and leaves after expansion through the outlet port K. The distributor M controls the admission, the degree of expansion and the exhaust. The downward stroke of the piston is by gravity assisted, for example, by the action of a fly-wheel (not shown). The entire structure is heavily lagged with a heat-insulating composition.

Figs. 2, 3, 4, 5 and 6 represent various embodiments equipped with pneumatically-actuated mechanism for the control of the distributing element as applied to a single effect expansion cylinder. For instance, as in Fig. 1, the gas which expands is supposed to be compressed air. In these figures the distributor is a cylindrical piston-valve M carrying a groove $n$ and provided at one of its faces with a recess $o$ which corresponds to the extremity of the screw v. The whole arrangement, comprising the recess o coacting with the screw v, acts in the manner of a buffer applied to the piston-valve M, the movements of which towards the left are more or less retarded by the degree of compression of the air contained in the recess o, the degree of compression depending upon the amount the extremity q of the screw extends into this recess, and hence being regulated from the exterior by turning the screw v in the right direction. Small auxiliary piston-valve t and t' are displaced by the piston H at the end of its downward and upward stroke respectively and returned to their original position by springs r and r'.

Connections between the chest of the distributor M and those of the small piston-valves t and t' as well as between the latter and the compressed air supply pipe I and the expanded air exhaust pipe K, are made by means of tubing. A vent is arranged at the point f of the pipe connection. The effective area of the vent may be varied by adjusting the position of the screw R, thereby regulating the speed of displacement of the piston-valve M towards the right.

As will be readily seen by reference to the Fig. 2, the displacements of the small piston valves t and t' by the piston H, upon arriving at the extreme ends of its stroke, cause the piston-valve M through the intermediary of the compressed air to occupy alternately the positions shown in Fig. 4 (air admission phase and upward stroke of piston H) and Fig. 5 (expansion to the end of the upward stroke of piston H) followed by its return to the position shown in Fig. 2 (exhaust phase and downward stroke of piston H). Figs. 3 and 6 show the respective positions of the auxiliary piston-valves t and t' when the piston H arrives at the extreme ends of its stroke. It will be seen that the length of the intake period may be determined at will by regulating the position of the screws V and R or of the latter alone.

Figures 7, 8:
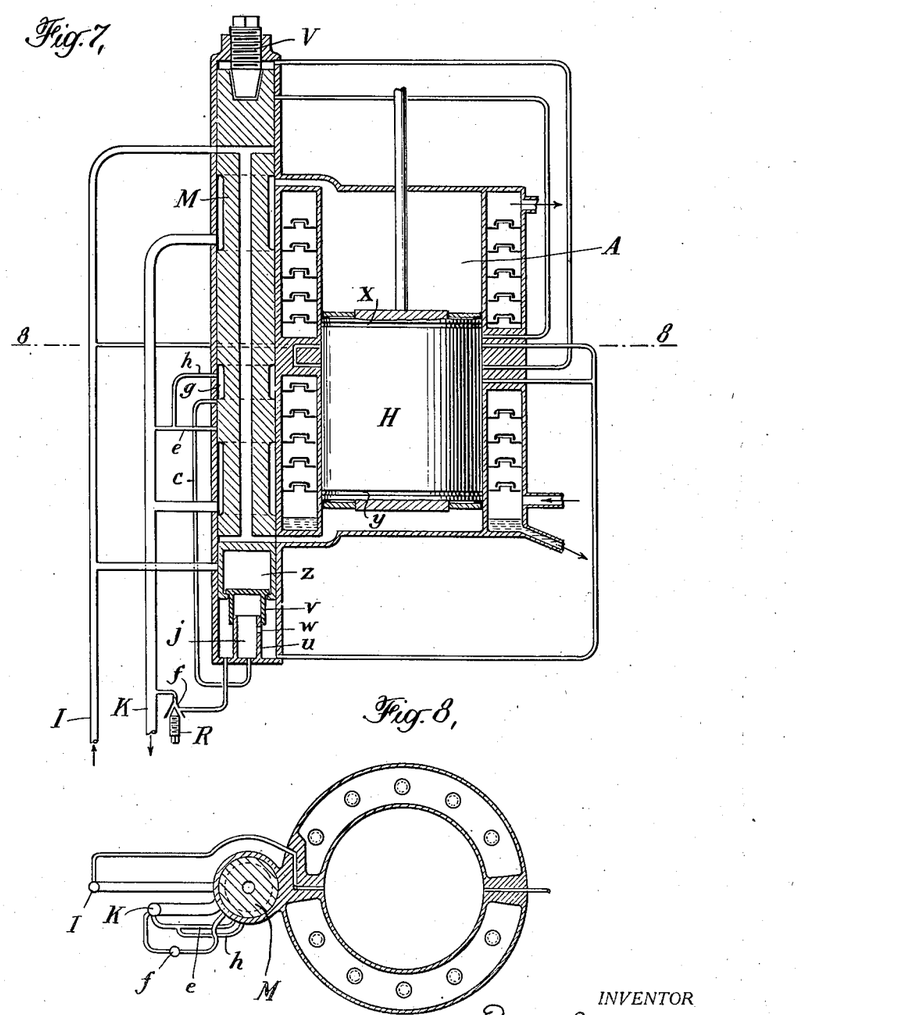
Fig. 7 is a diagram indicating another mode of applying the invention.
Fig. 8 is a section on the line 8—8 of Fig. 7.
Figure 9:
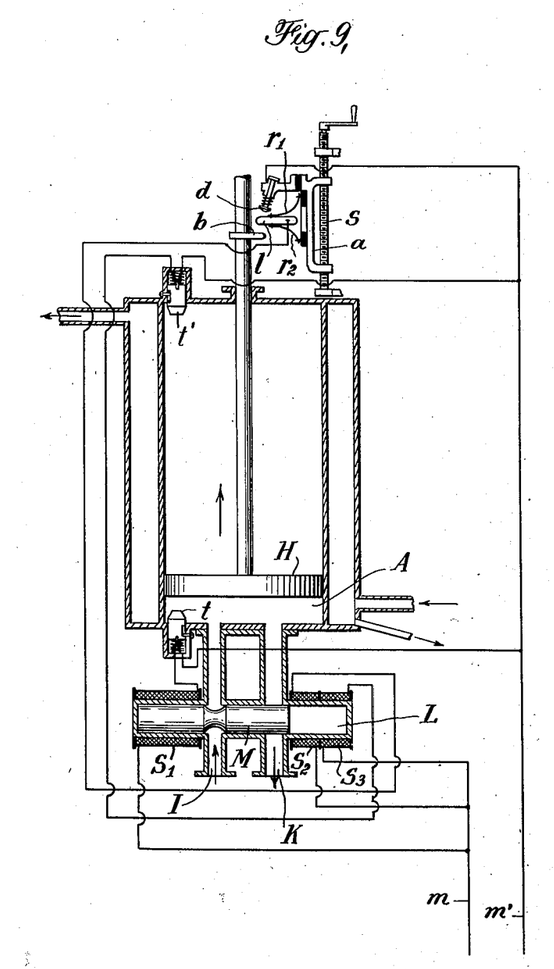
Figs. 9 to 12 are similar views showing another application of the invention.
Figure 10:
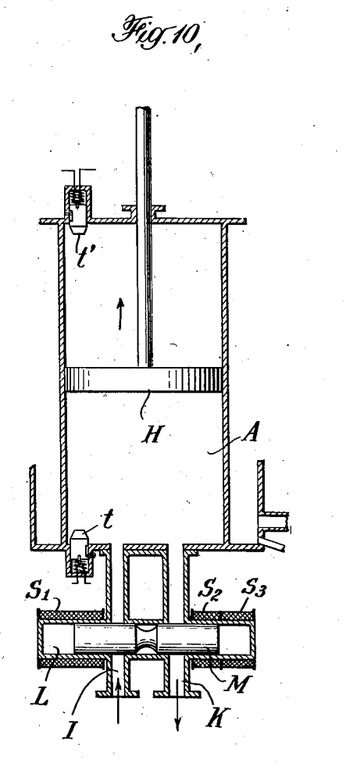
Figure 11:
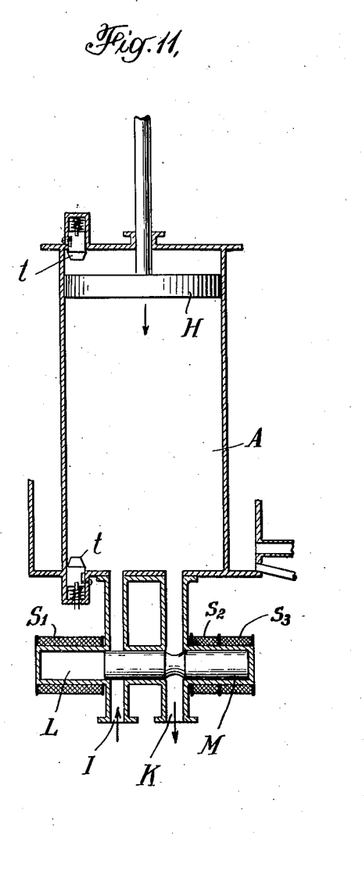

Figs. 7 and 8 represent an example of pneumatic control of the distribution for double-effect expansion. The piston H is provided with two annular grooves x and y which, by establishing communication at the appropriate moments between conduits opening into the cylinder A, determine the displacement of the piston-valves M which latter, by its successive positions, controls the distribution. The screw V as well as the control screw R of an air vent, as at f, carry out in this case the same functions as in Fig. 2.

A hollow sleeve V is slidingly but loosely mounted on a tubular support u forming an auxiliary slide-valve which periodically opens a lateral opening W at the upper part of this support. This auxiliary slide-valve V slides freely in a recess Z of the piston-valve M, with an amount of vertical play which, however, is less than the travel of the valve M so that the latter, after having accomplished part of its upward stroke corresponding to this play, carries the auxiliary slide valve V with it, and the latter, after having been displaced along the support u, uncovers the opening W. Upon the return stroke the valve M, having traveled the same distance in its downward course, actuates the auxiliary slide valve V and closes the opening W.

By examining the figure, the manner of operation will be readily understood. The auxiliary valve V opening and closing the orifice W at suitable periods, the rapid closure of the inlet port, owing to the groove g of the piston-valve M which, at the desired moment establishes communication between the pipe c and the pipes e and h respectively, connected to the exhaust port K. This communication, by bringing about the rapid blowing off of part of the air contained in the space g, causes momentarily and during the time necessary for the closure of the admission ports, a greater speed of the piston-valve M during its downward stroke.

Figs. 9, 10, 11 and 12 illustrate an electrically controlled distributing mechanism as applied to a single-effect expansion cylinder. The cylinder L in which moves the piston-valve M, is made of a non-magnetic metal, e. g., bronze. The piston-valve M is made of soft iron and forms the plunger of the solenoids $S_1$ $S_2$ and $S_3$ wound around the cylinder L. An electric current is sent into the solenoid $S_1$ by means of a contact which is established when the piston H is at the bottom of its stroke so that the valve M takes the position of Fig. 9 which is that at which the piston H rises. This contact ceases when the piston rises, and another contact, sending the current into the solenoid $S_2$, is established when the piston H reaches the point of its course at which expansion ought to begin. The valve M, because of the effect of the solenoid $S_2$, assumes the position of Fig. 10 in which the admission port is shown to be closed. This second contact ends when the piston H continues its travel and a new contact, sending the current into the solenoid $S_3$, is established when the piston H arrives at the top of its stroke so that under the action of solenoid $S_3$ the slide valve takes the position of Fig. 11 in which the exhaust port is open and the piston begins its downward stroke. At the lower end of its stroke the piston H reestablishes the first contact as above described, and the same cycle recommences. By means of a sliding contact bridge whereby the solenoid $S_2$ is energized and, hence, the admission port is closed, the degree of expansion can be varied at will.

Figure 12:
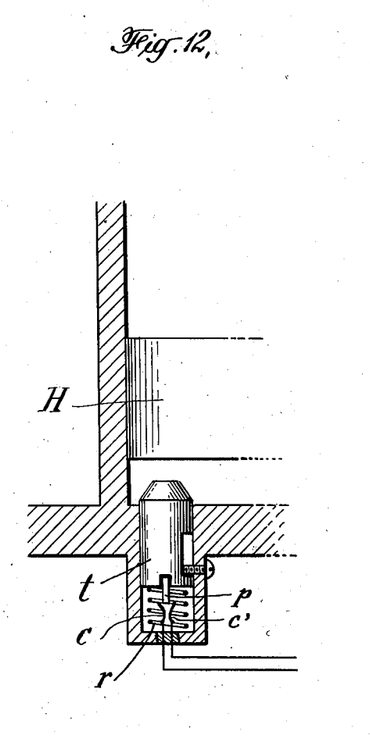

The apparatus for establishing the contacts may be given various forms. In Figs. 9 to 12, for instance, where $m$ and $m'$ are the conductors connected to the source of electricity, the mechanisms for establishing contact at the extreme ends of the piston stroke, consist of small spring-controlled contact studs $t$ and $t'$ against which the piston H strikes. The expansion contact is controlled by a small articulated lever $l$, which is returned to its middle position by springs $r$, $r_2$ after the piston rod, provided for this purpose with an abutment $b$, has lifted it to make electric contact at $d$. No contact is made during the return of the piston rod, as there should be contact only during the upward stroke. All these elements, comprising the lever $l$, its springs $r_1$ and $r_2$, and the contact piece $d$, are mounted on a bracket $a$ which can be shifted parallel to the axis of the cylinder by means of the screw S, whereby one may vary at will the moment when contact is made at $d$ and, hence, the moment when the expansion starts. Fig. 12 shows in detail how the electric circuit is closed when one of the studs $t$ or $t'$ ($t$, for instance), is pushed inwardly by the piston H upon its arrival at the bottom of its stroke; the conducting and insulated piece $p$ is thus made to bear against two conducting branches $c$ and $c'$ connected to the electric circuit. It is understood, of course, that all of the parts are properly insulated.

If desired, the solenoids may be located inside the distribution chest, particularly when, owing to the increase in pressure, it is desirable to provide such a wall thickness for the chest as to render the outer coils wound thereon impracticable on account of the large air-gap. The solenoids may also be easily combined so as to bring about distribution in the case of a double-effect expansion engine.

It will be noticed that in all these distribution mechanisms, one and the same element, i. e., the piston-valve, alternately opens and closes the admission and exhaust port, so that in no case can these two parts be opened or closed simultaneously. This arrangement entails a considerable advantage over the distribution mechanisms in which distinct closing elements which may be simultaneously opened and closed are employed. In the latter case accidents are liable to occur.

When applying the improvements forming the subject matter of the present application, for instance, to the separation of air into its elements by liquefaction and rectification, with production of cold by means of the expansion of compressed air effecting external work, an improved method results.

In this method the compressed air, after a preliminary cooling by heat exchange with the gases leaving after separation, goes partly into the interior of the expansion chamber and partly into the liquefaction and rectification chamber surrounding the expansion chamber. The partially expanded air in the expansion chamber is sent into the interior of another chamber bathed externally by the liquid coming from a rectification column. It is there partly or totally liquefied, thereby causing the simultaneous vaporization of the external liquid. The products of these various condensations are discharged into the rectification column at heights corresponding with their respective compositions.

Figure 13:
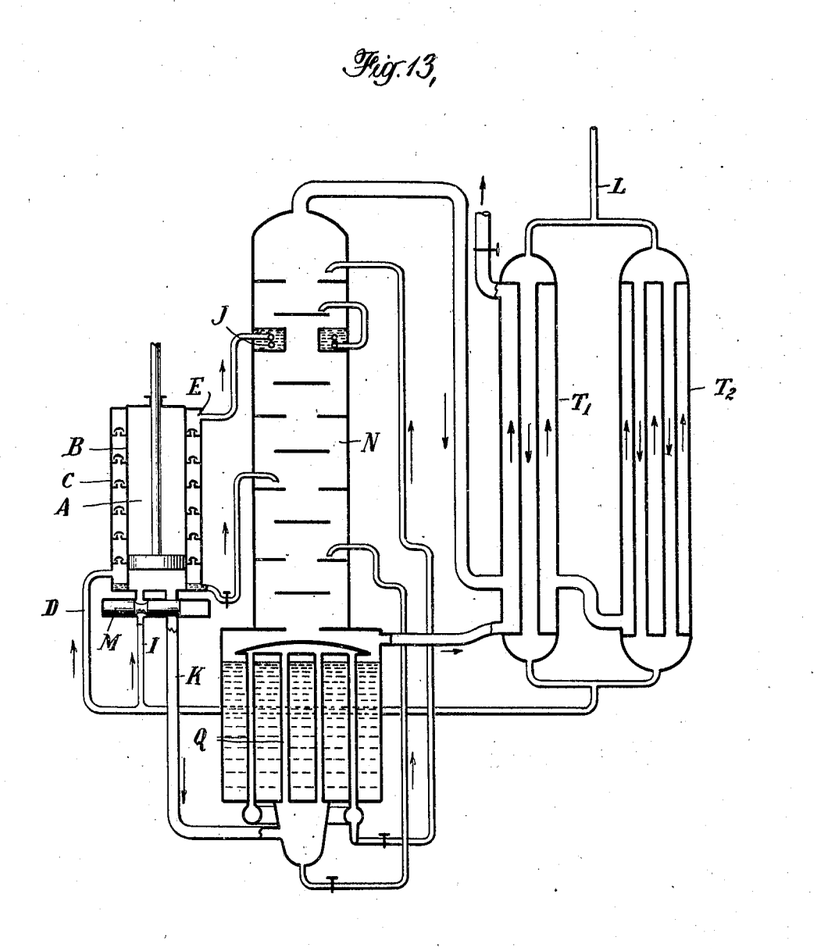
Figs. 13 and 14 are diagrams showing how the invention is combined with apparatus for liquefying gaseous mixtures and separating the constituents thereof.

Fig. 13 shows an apparatus for carrying this improved process into practice. The compressed air arriving at L passes through heat-exchangers $T_1$, $T_2$. Part of the air goes through the tube I into the expansion cylinder A while another part passes through the tube D into the space between the two walls B and C, which space, fitted with column plates, forms the liquefaction and rectification chamber. The expansion cylinder with its double wall and the column plates is in its other parts, constructed as has been explained for Fig. 1. The distributing mechanism is controlled by one of the mechanisms described above. The partly expanded gas leaving the cylinder A by the pipe K passes into a rectifying column N and a vaporizer liquefier Q surrounded externally by the liquid refluxed from the column. The gas forming the residue from the partial liquefaction and rectification is liquefied in a coil J immersed in liquid in the column before being introduced therein. The figure clearly shows the various circuits carried out by the air, the liquid and the separated gases, respectively.

The compressed air, previously cooled by heat exchange may, if desired, also be sent in its entirety into the liquefaction and rectification jacket. In that case, however, the gaseous residue from these operations, after partial expansion for the production of cold, is delivered, as described above, to the liquefaction vaporization chamber, and into the rectification column.

Figure 14:
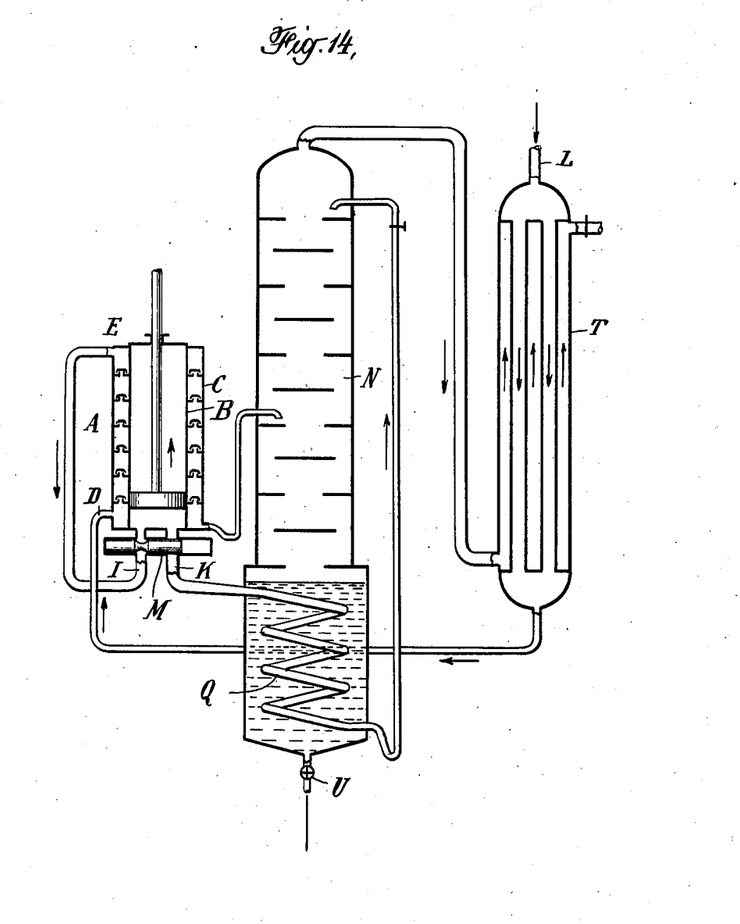

Fig. 14 represents an apparatus for carrying out the above-described process in connection with the liquefaction of oxygen. The same reference characters refer to the same parts as in Fig. 13. In this case the residual gas leaving at E after partial liquefaction and rectification of the compressed air, all of which is supplied through tube D, passes through I into the expansion chamber, leaving the latter through pipe K which conveys it into the coil Q constituting the liquefier vaporizer. The liquefied oxygen is drawn off through the valve U.

Various changes may be made in the details of operation and the form and arrangement of the parts without departing from the invention or sacrificing any of the advantages thereof.

I claim:—

1. The method of separating the constituents of gaseous mixtures by liquefaction and rectification, which comprises liquefying and simultaneously rectifying the gaseous mixture by the refrigerative effect of a gas, which is expanding with external work, in a chamber in heat transfer relation with the chamber in which the expansion occurs.

2. The method of separating the constituents of gaseous mixtures by liquefaction and rectification, which comprises causing the gaseous mixture to travel upwardly while it is subjected for liquefaction and simultaneous rectification to the refrigerative effect of a gas, which is expanding with external work, in a chamber in heat transfer relation with the chamber in which the expansion occurs.

3. The method of separating the constituents of gaseous mixtures by liquefaction and rectification, which comprises causing the gaseous mixture to travel upwardly while it is subjected for liquefaction and simultaneous rectification to the refrigerative effect of a gas, which is expanding with external work, in a chamber in heat transfer relation with the chamber in which the expansion occurs, withdrawing the residual unliquefied gas from the top of the liquefaction chamber and the liquid from the bottom thereof.

4. The method of separating the constituents of gaseous mixtures by liquefaction and rectification, which comprises causing the gaseous mixture to travel upwardly while it is subjected for liquefaction and simultaneous rectification to the refrigerative effect of a gas, which is expanding with external work, in a chamber in heat transfer relation with the chamber in which the expansion occurs, withdrawing the residual unliquefied gas from the top of the liquefaction chamber and the liquid from the bottom thereof, and expanding the residual unliquefied gas to produce the refrigerative effect.

5. The method of separating the constituents of gaseous mixtures by liquefaction and simultaneous rectification, which comprises subjecting the gaseous mixture to the refrigerative effect of a gas, which is expanding with external work, in a chamber in heat transfer relation with the chamber in which the expansion occurs, withdrawing the liquid and the residual unliquefied gas and subjecting them to a rectification.

6. The method of separating the constituents of gaseous mixtures by liquefaction and simultaneous rectification, which comprises subjecting the gaseous mixture to the refrigerative effect of a gas, which is expanding with external work, in a chamber in heat transfer relation with the chamber in which the expansion occurs, withdrawing the liquid and the residual unliquefied gas, liquefying the residual unliquefied gas and subjecting both liquids to a rectification.

7. The method of separating the constituents of gaseous mixtures by liquefaction and rectification, which comprises causing the gaseous mixture to travel upwardly while it is subjected for liquefaction and simultaneous rectification to the refrigerative effect of a gas, which is expanding with external work, in a chamber in heat transfer relation with the chamber in which the expansion occurs, withdrawing the residual unliquefied gas from the top of the liquefaction chamber and the liquid from the bottom thereof and subjecting them to further rectification.

8. The method of separating the constituents of gaseous mixtures by liquefaction and rectification, which comprises causing the gaseous mixture to travel upwardly while it is subjected for liquefaction and simultaneous rectification to the refrigerative effect of a gas, which is expanding with external work, in a chamber in heat transfer relation with the chamber in which the expansion occurs, withdrawing the residual unliquefied gas from the top of the liquefaction chamber and the liquid from the bottom thereof, liquefying the residual unliquefied gas and subjecting both liquids to further rectification.

9. The method of separating the constituents of gaseous mixtures by liquefaction and rectification, which comprises causing the gaseous mixture to travel upwardly while it is subjected for liquefaction and simultaneous rectification to the refrigerative effect of a gas, which is expanding with external work, in a chamber in heat transfer relation with the chamber in which the expansion occurs, withdrawing the residual unliquefied gas from the top of the liquefaction chamber and the liquid from the bottom thereof, expanding the residual unliquefied gas to produce the refrigerative effect, liquefying the expanded residual gas and subjecting both liquids to further rectification.

10. The method of separating the constituents of gaseous mixtures by liquefaction and rectification, which comprises compressing and cooling the gaseous mixture, causing a portion thereof to expand with external work, subjecting the remainder of the gaseous mixture for liquefaction and simultaneous rectification to the refrigerative effect of the expanding mixture in a chamber in heat transfer relation with the chamber in which expansion occurs and subjecting the products of the liquefaction thus accomplished to rectification.

11. The method of separating the constituents of gaseous mixtures by liquefaction and rectification, which comprises compressing and cooling the gaseous mixture, subjecting it for liquefaction and simultaneous rectification to the refrigerative effect of a gas, which is expanding with external work, in a chamber in heat transfer relation with the chamber in which the expansion occurs, expanding the unliquefied residual gas to produce the refrigerative effect, liquefying the expanded residual gas and subjecting it with the liquid produced by refrigeration of the gaseous mixture before expansion to rectification.

12. The method of separating the constituents of gaseous mixtures by liquefaction and rectification, which comprises compressing and cooling the gaseous mixture, causing a portion thereof to expand with external work, subjecting the remainder of the gaseous mixture for liquefaction and simultaneous rectification to the refrigerative effect of the expanding mixture in a chamber in heat transfer relation with the chamber in which expansion occurs and subjecting the products of the liquefaction thus accomplished to rectification after liquefaction of the expanded gaseous mixture.

13. In an apparatus for separating the constituents of gaseous mixtures, the combination of an expansion chamber, a jacket therefor, means for introducing a gaseous mixture to the jacket, means for withdrawing a liquid therefrom and means in the jacket to ensure intimate contact between liquid formed and decending therein and the gaseous mixture rising therethrough.

14. In an apparatus for separating the constituents of gaseous mixtures, the combination of an expansion chamber, a jacket therefor, means for introducing the gaseous mixture to the jacket, means for withdrawing a liquid therefrom, means in the jacket to ensure intimate contact between liquid formed and descending therein and the gaseous mixture rising therethrough, a movable piston in the expansion chamber and remote control means actuated by the movement of the piston to ensure the introduction and withdrawal of fluid to and from the expansion chamber at appropriate intervals.

In testimony whereof I affix my signature.

EUGÈNE JORDAN.